(12) United States Patent
Watts et al.

(10) Patent No.: US 10,488,523 B2
(45) Date of Patent: *Nov. 26, 2019

(54) USING LASER SENSORS TO AUGMENT STEREO SENSOR READINGS FOR ROBOTIC DEVICES

(71) Applicant: X Development LLC, Mountain View, CA (US)

(72) Inventors: Kevin William Watts, Palo Alto, CA (US); Kurt Konolige, Menlo Park, CA (US)

(73) Assignee: X Development LLC, Mountain View, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/642,530

(22) Filed: Jul. 6, 2017

(65) Prior Publication Data

US 2017/0308086 A1    Oct. 26, 2017

Related U.S. Application Data

(63) Continuation of application No. 14/828,437, filed on Aug. 17, 2015, now Pat. No. 9,746,852.

(51) Int. Cl.
*G01S 17/93* (2006.01)
*G01S 17/02* (2006.01)
(Continued)

(52) U.S. Cl.
CPC .......... *G01S 17/936* (2013.01); *G01S 17/023* (2013.01); *G01S 17/87* (2013.01); *G05D 1/0248* (2013.01);
(Continued)

(58) Field of Classification Search
CPC ...... G01S 17/936; G01S 17/023; G01S 17/87; G05D 1/0251; G05D 1/0248;
(Continued)

(56) References Cited

U.S. PATENT DOCUMENTS 5,529,138 A * 6/1996 Shaw .................... B60K 23/08
                                                    180/169
7,068,815 B2   6/2006 Chang et al.
(Continued)

FOREIGN PATENT DOCUMENTS

EP           2775316          9/2014

OTHER PUBLICATIONS

Hedenberg, Klas, "Obstacle Detection for Driverless Trucks in Industrial Environments," Halmstad Univerisyt Dissertations No. 7, Halmstad University Press, 2014, 92 pages.
(Continued)

*Primary Examiner* — Dale Moyer
(74) *Attorney, Agent, or Firm* — McDonnell Boehnen Hulbert & Berghoff LLP

(57) ABSTRACT

An example system includes one or more laser sensors on a robotic device, where the one or more laser sensors are configured to produce laser sensor data indicative of a first area within a first distance in front of the robotic device. The system further includes one or more stereo sensors on the robotic device, where the stereo sensors on the robotic device are configured to produce stereo sensor data indicative of a second area past a second distance in front of the robotic device. The system also includes a controller configured to receive the laser sensor data, receive the stereo sensor data, detect one or more objects in front of the robotic device based on at least one of the laser sensor data and the stereo sensor data, and provide instructions for the robotic device to navigate based on the one or more detected objects.

12 Claims, 16 Drawing Sheets

(51) Int. Cl.
*G01S 17/87* (2006.01)
*G05D 1/02* (2006.01)

(52) U.S. Cl.
CPC ... *G05D 1/0251* (2013.01); *G05D 2201/0216* (2013.01)

(58) Field of Classification Search
CPC ............ G05D 2201/0216; B25J 9/1697; B25J 19/022; G06T 7/593; G06T 2207/10012; G06T 7/521
See application file for complete search history.

(56) References Cited

U.S. PATENT DOCUMENTS

| | | | |
|---|---|---|---|
| 8,332,134 | B2 | 12/2012 | Zhang et al. |
| 8,442,714 | B2 | 5/2013 | Matsukawa et al. |
| 8,880,273 | B1 | 11/2014 | Chatham |
| 9,069,080 | B2 | 6/2015 | Stetiner et al. |
| 2005/0246065 | A1 | 11/2005 | Ricard |
| 2012/0173018 | A1 | 7/2012 | Allen et al. |
| 2012/0182392 | A1* | 7/2012 | Kearns ................ B25J 11/009 348/46 |
| 2013/0226344 | A1* | 8/2013 | Wong .................. G05D 1/024 700/258 |
| 2014/0074287 | A1 | 3/2014 | LaFary et al. |
| 2014/0324270 | A1* | 10/2014 | Chan ..................... G01S 17/42 701/28 |
| 2015/0185322 | A1 | 7/2015 | Haegermarck |
| 2015/0362921 | A1* | 12/2015 | Hanaoka ............... G01B 11/24 701/23 |
| 2016/0198144 | A1* | 7/2016 | Yu ....................... H04N 13/243 348/48 |
| 2016/0270619 | A1 | 9/2016 | Lu et al. |

OTHER PUBLICATIONS

Kumar et al., "Sensor Fusion of Laser & Stereo Vision Camera for Depth Estimation and Obstacle Avoidance," International Journal of Computer Applications (0975-8887), 2010, pp. 22-27, vol. 1, No. 26.

* cited by examiner

Front View

Front View

USING LASER SENSORS TO AUGMENT STEREO SENSOR READINGS FOR ROBOTIC DEVICES

CROSS-REFERENCE TO RELATED APPLICATION

This application claims priority to U.S. patent application Ser. No. 14/828,437 filed on Aug. 17, 2015 and entitled "Using Laser Sensors to Augment Stereo Sensor Readings for Robotic Devices," which is incorporated herein by reference as if fully set forth in this description.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may help to detect obstacles using a safety system. The safety system may be installed on a robotic device to detect obstacles in the direction of travel of the robotic device. The safety system may include one or more stereo sensors and one or more laser sensors. The stereo sensor(s) may collect data about a specified area in front of the robotic device, and the laser sensor(s) may collect data about a different specified area in front of the robotic device. The safety system may then use the collected data to detect any objects in front of the robotic device, and may calculate the distances to any detected object. The safety system may also provide the control system of the robotic device with instructions on how to react to any obstacle that may be detected.

In one example, a system is disclosed that includes one or more laser sensors on a robotic device, where the one or more laser sensors are configured to produce laser sensor data indicative of a first area within a first distance in front of the robotic device. The system also includes one or more stereo sensors on the robotic device, where the one or more stereo sensors on the robotic device are configured to produce stereo sensor data indicative of a second area past a second distance in front of the robotic device, where the second distance is closer to the robotic device than the first distance. Furthermore, the system includes a controller configured to receive the laser sensor data indicative of the first area within the first distance in front of the robotic device from the one or more laser sensors; receive the stereo sensor data indicative of the second area past the second distance in front of the robotic device from the one or more stereo sensors; detect one or more objects in front of the robotic device based on at least one of the laser sensor data and the stereo sensor data; and provide instructions for the robotic device to navigate based on the one or more detected objects.

In another example, a method is provided that includes receiving laser sensor data from a plurality of laser sensors on a robotic device, where the laser sensor data is indicative of a first area within a first distance of a direction of travel of the robotic device; and receiving stereo sensor data from one or more stereo sensors on the robotic device, where the stereo sensor data is indicative of a second area past a second distance in the direction of travel of the robotic device, where the second distance is closer to the robotic device than the first distance. The method further includes monitoring the first area based on the laser sensor data and the second area based on the stereo sensor data, detecting one or more objects in at least one of the first area and second area, and providing instructions for the robotic device to navigate based at least on the one or more detected objects.

In another example, a robotic device is disclosed that includes at least one motion component configured to cause motion of the robotic device in a direction of travel. The device also includes a plurality of laser sensors on the robotic device, where the plurality of laser sensors are configured to: project respective narrow laser beams in front of the robotic device in the direction of travel of the robotic device, detect reflected laser beams at the robotic device from at least some of the projected narrow laser beams, and detect objects within a first area up to a first distance in the direction of travel of the robotic device based on the reflected laser beams. Further, the robotic device includes one or more stereo sensors on the robotic device, wherein the one or more stereo sensors on the robotic device are configured to: receive respective images captured by at least two optical elements from at least two respective viewpoints, identify corresponding features between the respective images captured by the at least two optical elements, and detect objects within a second area past a second distance in the direction of travel of the robotic device based on the corresponding features, where the second distance is closer to the robotic device than the first distance In yet another aspect, another system is provided. The system includes means for receiving laser sensor data from a plurality of laser sensors on a robotic device, where the laser sensor data is indicative of a first area within a first distance of a direction of travel of the robotic device. The system further includes means for receiving stereo sensor data from one or more stereo sensors on the robotic device, where the stereo sensor data is indicative of a second area past a second distance in the direction of travel of the robotic device, where the second distance is closer to the robotic device than the first distance. Based on the laser sensor data and the second area based on the stereo sensor data, the system further includes means for monitoring the first area. Further, the system includes means for detecting one or more objects in at least one of the first area and second area, and providing instructions for the robotic device to navigate based at least on the one or more detected objects.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
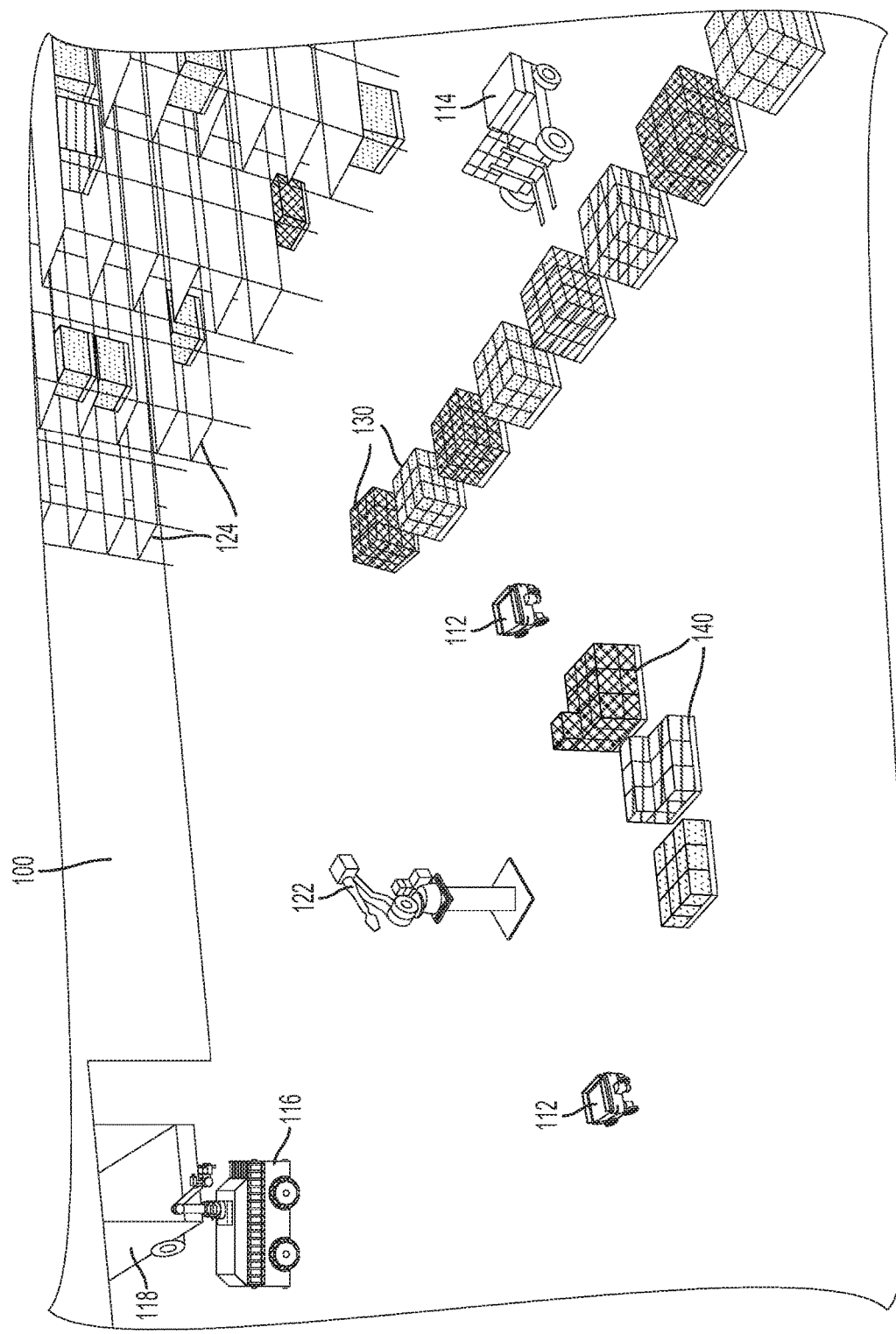
FIG. 1A shows a robotic fleet, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures AGVs (Autonomous Guided Vehicles) may be required to detect obstacles when moving. Various regulations for robotic devices exist, and the sensors for obstacle detection used may be "safety rated." The safety rating process proscribes a number of requirements on detectable objects and redundancy. Some AGV safety systems currently use planar LIDAR sensors to perform this obstacle detection function. Because they only see a single plane, these sensors don't always see overhanging obstacles. Detecting obstacles such as tables and chairs may be particularly problematic for these sensors. Furthermore, due to the relatively high cost and poor performance of these sensors, it may be advantageous to use stereo sensors as safety sensors for AGVs. However, stereo sensors may sometimes have problems with detecting obstacles located within a short range of the AGV.

A stereo sensor uses two optical elements to measure the distance to objects in a scene. Images from each optical element are correlated to find possible matches in the scene. After matches are determined, the distance to objects may be calculated. As a result, a stereo sensor can calculate distances to objects only in the region of overlap between the field of view of its two optical elements. This method of operation is therefore limited by the field of view of each camera, making it difficult for a stereo sensor to detect objects located within a short distance from the sensor. As such, when the AGV is using a stereo sensor as a safety sensor, it may use a different system to detect objects of at least a predetermined minimum size up to some distance in the direction of travel of the AGV.

Within examples, laser sensors may be used to augment stereo sensors in a safety system of the AGV. In particular, the laser sensors may project narrow laser beams, which are effective at measuring distances to objects by detecting reflected beams. The objects may be located within a short distance from the sensor. To be utilized in an exemplary AGV safety system, the short range laser sensors may be aligned at a certain height in a horizontal plane on the front end of the AGV. In other examples, the laser sensors may be arranged in other configurations (e.g., arranged horizontally in multiple rows on the front end of the AGV). The spacing of the sensors on the AGV may be chosen such that the sensors are able to detect obstacles of at least predetermined size up to a predetermined distance.

In these AGV safety systems, the laser sensors may provide the controller of the system with laser sensor data indicative of a first region of coverage up to a first predetermined distance in front of the device. Further, the stereo sensors may be mounted on the AGV in a configuration that provides the AGV safety system controller with stereo sensor data indicative of a second region of coverage past a second predetermined distance in front of the device. The predetermined distance for each sensor type is determined such that the distance is within the range of each sensor. The predetermined distances may also be chosen such that the resulting regions of coverage for each sensor overlap. Furthermore, the stereo sensor(s) may be arranged on the AGV such that its region of coverage is wider than the width of the AGV. The laser sensor(s) may have a region of coverage that has width that is substantially as wide as the AGV. The overall region of coverage for the safety system may be a combination of the first region and the second region.

The controller of the safety system may use the data provided by both types of sensors to detect one or more obstacles in its overall region of coverage. Specifically, it may use laser sensor data to detect obstacles in the first region of coverage, and may use stereo sensor data to detect obstacles in the second region of coverage. Further, in embodiments with an overlapping region of coverage, the controller may use either the laser sensor data or the stereo sensor data to detect obstacles.

Using the data provided by the sensors, the safety system may assist in the navigation of the AGV by providing instructions to the control system of the AGV. For example, the control system may control the speed of the AGV based on the sensor data and instructions that it receives from the controller of the safety system. In other examples, the control system may direct the AGV to maneuver around an obstacle based on the received data. In certain embodiments, the safety system may be implemented within the control system of the AGV, where both systems are governed by a single controller.

In additional embodiments, the safety system of the AGV may also be equipped with a plurality of optical elements that make up two or more stereo sensors. In an example of this embodiment, the AGV is equipped with two stereo sensors comprised of two primary optical elements and one secondary stereo optical element. In the first sensor, one primary optical element and the secondary optical element may be arranged on the AGV in a wide baseline arrangement. The other primary optical element and the secondary optical element may be arranged in a narrow baseline arrangement on the AGV, to make up the second stereo sensor. In the narrow baseline arrangement, the two optical elements may be arranged closer together than the two optical elements in the wide baseline arrangement. In this setup, the wide baseline sensor may be suitable for long range obstacle detection, and the narrow baseline sensor may be suitable for short range obstacle detection. In further examples, laser sensors may be used with a multi-baseline stereo system to augment the multiple baseline stereo sensors for short range obstacle detection.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
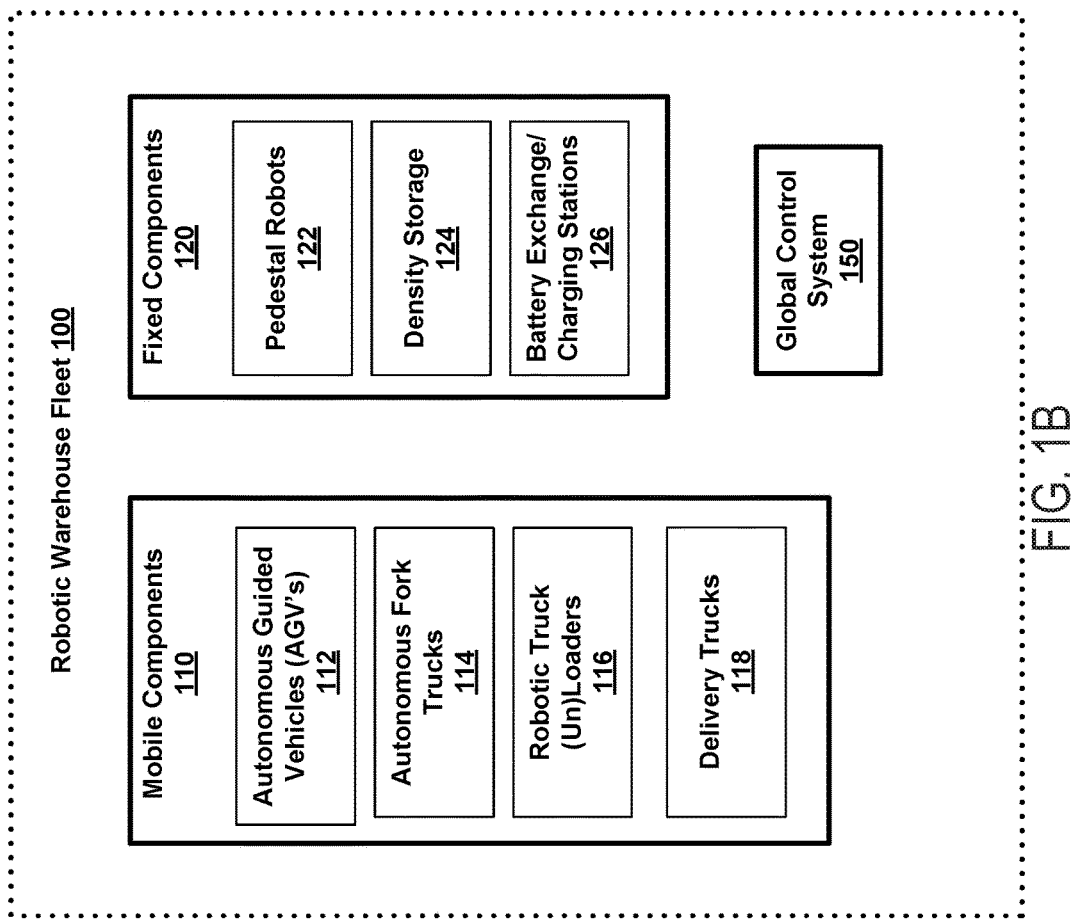
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once the map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
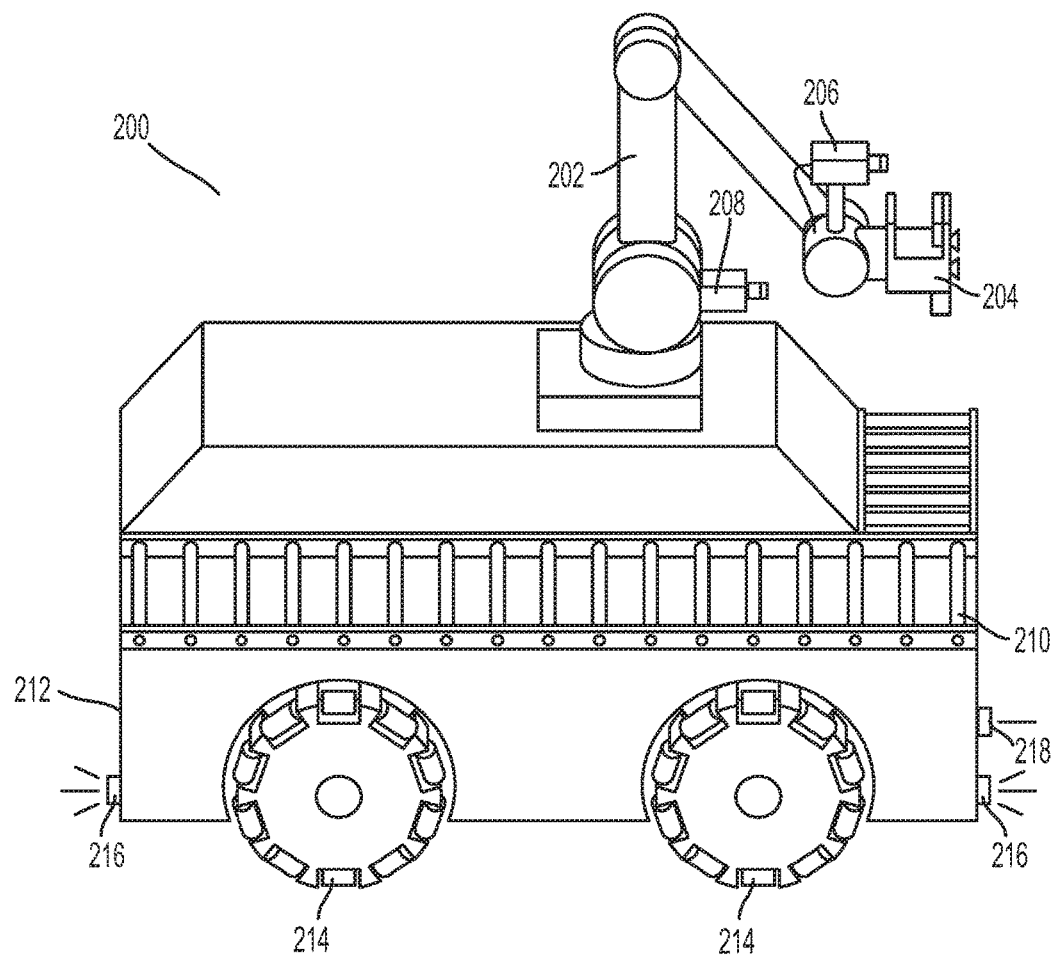
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a movable cart 212 with wheels 214 for locomotion. The wheels 214 may be holonomic wheels that allow the cart 212 to move with two degrees of freedom. Additionally, a wraparound front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a navigation sensors 216, safety sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
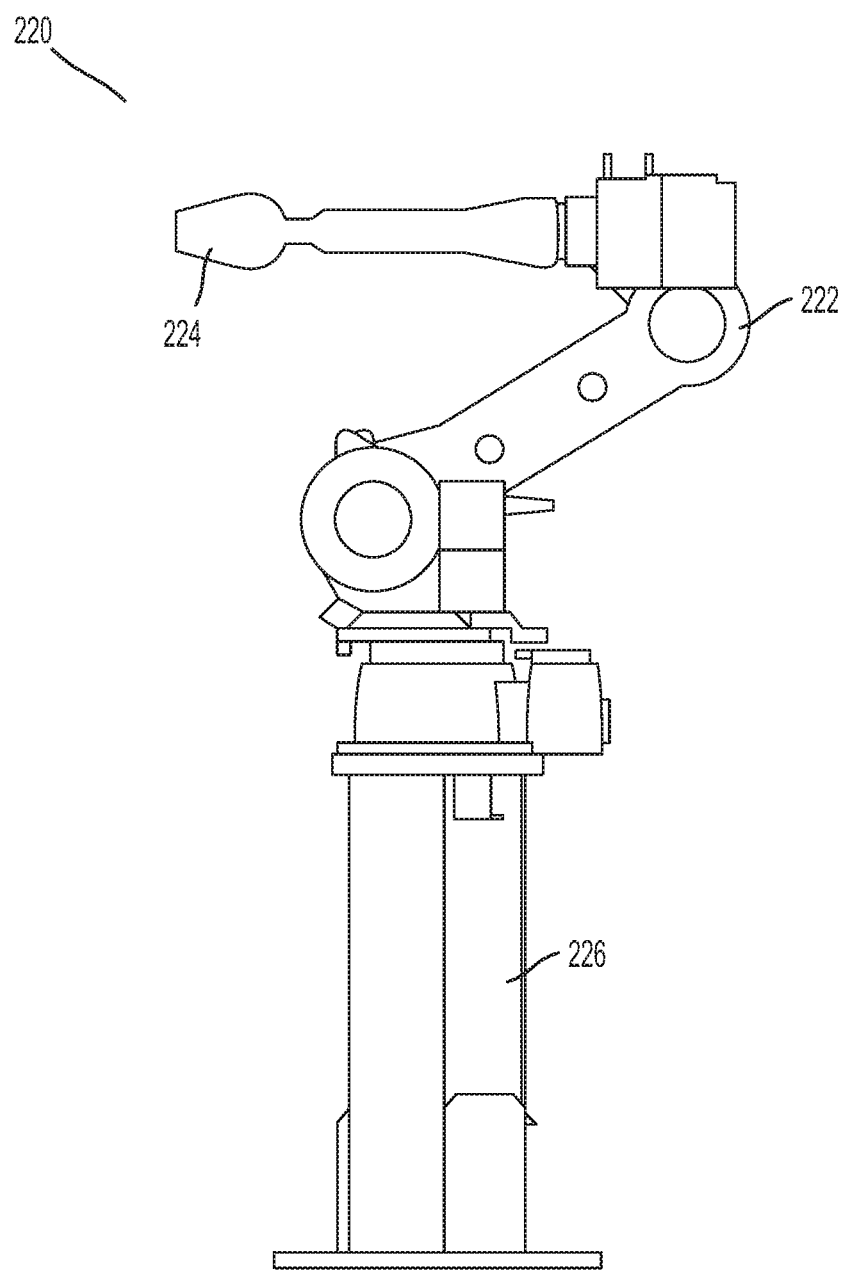
FIG. 2B shows a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
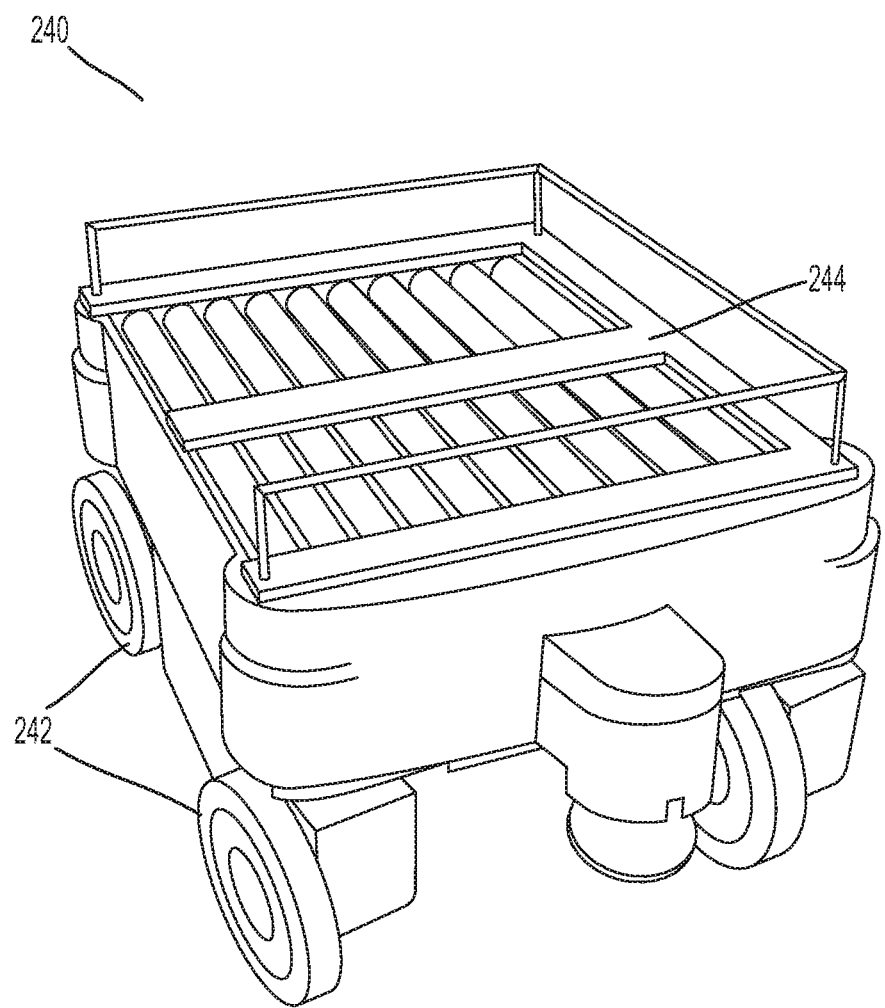
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
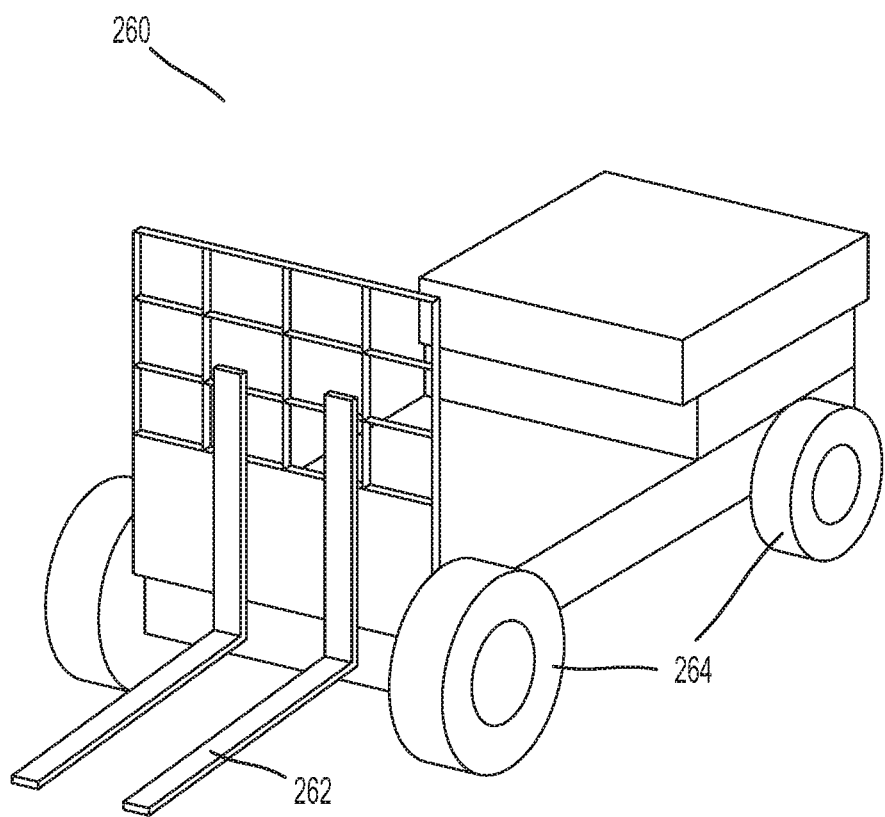
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Due to possible obstacles in a robotic device's environment, and in order to operate a robotic device safely, safety codes and regulations may be enforced on the operation of robotic devices. Specifically, safety codes and regulations may require safety systems to detect objects of at least a predetermined minimum size up to a certain distance away from the robotic device in its direction of travel. The safety codes and regulations may specify different obstacle sizes and distances from the robotic device depending on the environment that the device is in. For instance, safety codes may specify a specific minimum detectable obstacle size and distance for a robotic device used in industrial environments, such as in factories or warehouses. As an example, the safety codes may specify the minimum detectable obstacle size as any size between 30 mm to 200 mm. Other safety codes and regulations may exist for devices used in other environments, such as residential or retail environments.

Figure 3A:
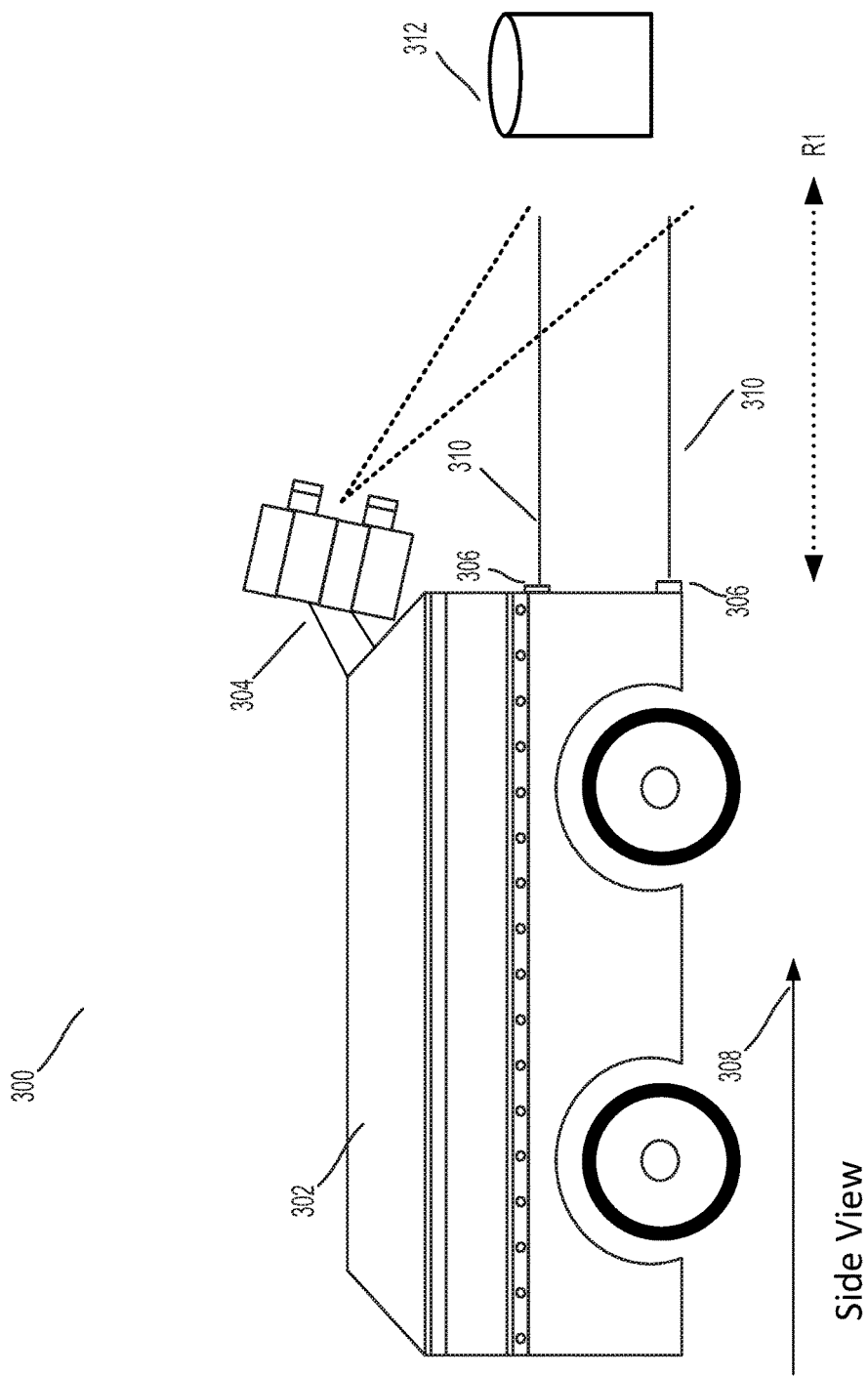
FIG. 3A is a side view of a safety system for a vehicle, according to an example embodiment.

FIG. 3A illustrates a side view of a robotic device safety system 300 configured to detect obstacles in a direction of travel of robotic device 302, according to an exemplary embodiment. Robotic device 302 may be a mobile robotic device with a motion component, such as any of the mobile robotic devices illustrated and described previously with respect to FIGS. 1A-1B and/or 2A-2D. In this embodiment, robotic device 302 is traveling down a path along direction of travel 308. As can be seen in FIG. 3A, obstacle 312 is located in the path of robotic device 302 in direction of travel 308. Obstacle 312 may be any object or person that may impede the movement of or damage robotic device 302, or that may be damaged as a result of a collision with robotic device 302. For example, obstacle 312 may be a chair, or another robotic device, and so on.

Accordingly, robotic device 302 may utilize safety system 300 to detect objects in its environment. Specifically, safety system 300 may include at least one stereo sensor 304 and laser sensors 306. These sensors may be mounted on the front end of robotic device 302, and may be oriented in direction of travel 308 in order to detect obstacles in at least that direction. The front end of robotic device 302 may constitute any surface on robotic device 302 that is substantially facing direction of travel 308. For example, laser sensors 306 may be mounted directly onto the body of robotic device 302, or they may be mounted onto a bumper attached to robotic device 302. In other examples, laser sensors 306 may be installed within apertures in the front end of robotic device 302. Sensors 304 may be mounted either directly onto the body of robotic device 302 or may be attached to a fixed mount on robotic device 302. In yet other examples, robotic device 302 may be traveling in the direction opposite to direction 308. Consequently, additional sensors may be mounted on the other end of robotic device 302. Further, sensors 304 and 306 may also be mounted on both ends of robotic device 302. In this configuration, safety system 300 may be capable of detecting obstacles as robotic device 302 moves forward in one direction of travel, and as robotic device 302 reverses in another direction, without needing to perform a 180 degree turn.

In other embodiments, stereo sensor 304 may be mounted on a panning platform that may be configured to pan around to provide a full 360 degree view of robotic device 302's surroundings. Within examples, the panning platform may spin around as robotic device 302 changes its direction of travel. For example, if robotic device 302 begins to move in a direction of travel opposite to its initial direction of travel, the panning platform may spin around such that stereo sensor 304 may be oriented in the new direction of travel. The panning platform may also spin to orient stereo sensor 304 in different directions for different modes of operation. For instance, a sweeping mode may be used to reconstruct the environment by integrating frames into a global map for obstacle detection in robotic device 302's environment.

Figure 3B:
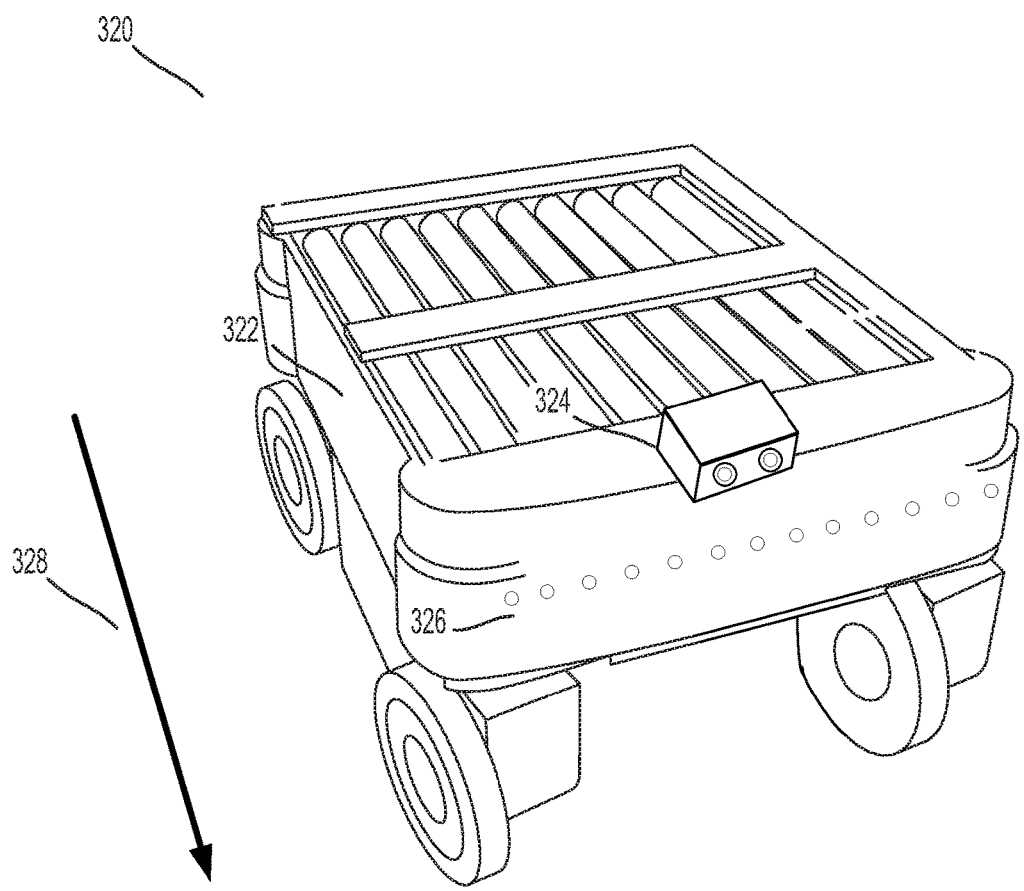
FIG. 3B is a front view of a safety system for a vehicle, according to an example embodiment.
Figure 3C:
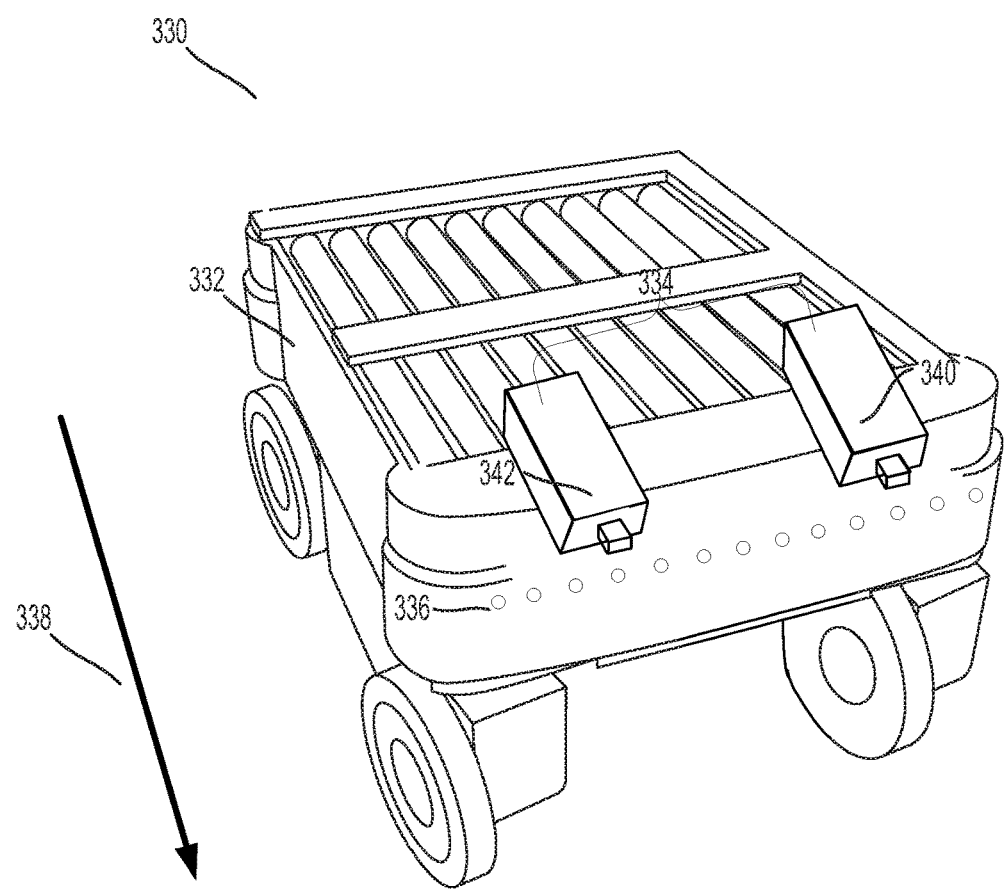
FIG. 3C illustrates is a front view of another safety system for a vehicle, according to an example embodiment.
Figure 7:
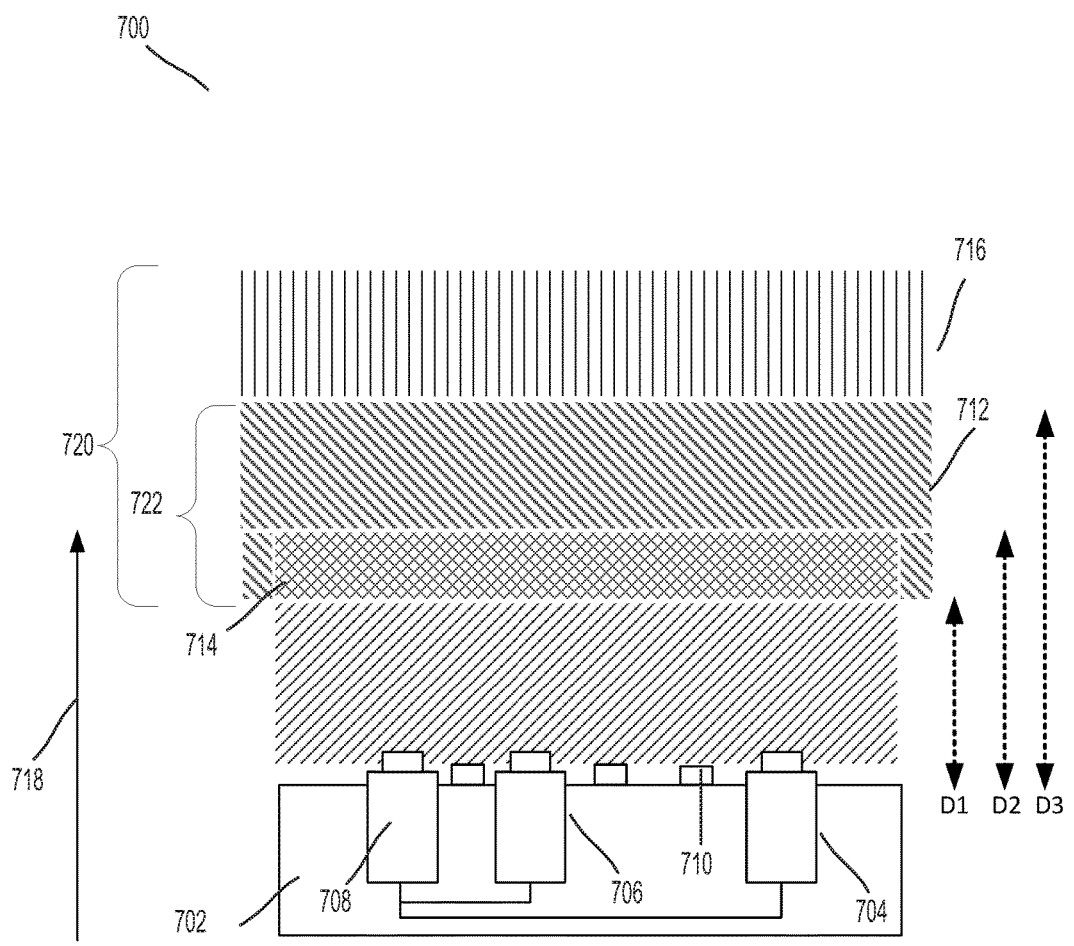
FIG. 7 illustrates a multi-baseline safety system, according to an example embodiment.

As shown in FIG. 3A, safety system 300 may include a stereo sensor 304 mounted on the front end of robotic device 302 and oriented in direction of travel 308. In some examples, a safety system may include more than one stereo sensor (e.g., the safety system as illustrated in FIG. 7). A stereo sensor may be comprised of two or more optical elements collectively configured to map out a 3D representation of a scene. The two or more optical elements of a stereo sensor may be installed as a single device. As an example, stereo sensor 304, illustrated in FIG. 3A, is a single device stereo sensor. In another example, FIG. 3B illustrates a front view of safety system 320 that includes single device stereo sensor 324. In yet other examples, the two or more optical elements of a stereo sensor may also be independent optical elements not housed in a single device. FIG. 3C illustrates sensor 334 with independent optical elements 340 and 342, configured to operate jointly as a stereo sensor. Stereo sensors with two optical elements, such as sensors 304, 324, and 334, may use their optical elements to measure the distance to objects in a scene by taking images of the scene from at least two respective viewpoints. Images from each optical element are then correlated to find possible corresponding features in the scene. After matches of corresponding features are determined, the distances to the detected objects detected may be calculated.

However, a stereo sensor may only accurately measure distances to objects within its field of view (FOV). Accordingly, a stereo sensor used in a robotic device safety system, may have a FOV that is at least as wide as the robotic device, in order to detect any possible obstacle that the robotic device may encounter. As such, stereo sensor 304 may be configured such that its FOV is at least as wide as robotic device 302. In FIG. 3A, R1 is the distance from robotic device 302 at which FOV 310 is at least as wide as robotic 302. This means that R1 may be the distance from the robotic device at which stereo sensor 304 may accurately monitor for obstacles. Furthermore, this distance may be predefined as it depends on the configuration of stereo sensor 304. For example, the distance may be determined at least by the distance between the cameras of a stereo sensor. In some examples, R1 may be the minimum range of stereo sensor 304. For instance, R1 may be 0.8 meters, which may be the minimum range of an example stereo sensor.

However, as can be seen in FIG. 3A, possible obstacles in the region extending from robotic device 302 to distance R1 (distance at which the coverage area of stereo sensor 304 starts), may possibly not be within the FOV of stereo sensor 304. Thus, safety system 300 may also include laser sensors 306 that are used to supplement the coverage of stereo sensor 304. In example embodiments, laser sensors may be used to augment stereo sensors by measuring distances to obstacles, in the region outside the FOV of stereo sensors. One example of a laser sensor is a laser rangefinder that detects obstacles by projecting a narrow laser beam configured to reflect off of an obstacle back to the sensor. The laser sensor may calculate the distance from the detected obstacle to the sensor by using the amount of time that it takes the beam to reflect off of the obstacle and back to the sensor. This calculation may also be known as a time-of-flight calculation. However, this sensor may have a limited range, and thus may be useful for detecting obstacles located only within a short range of the sensor.

Figure 9:
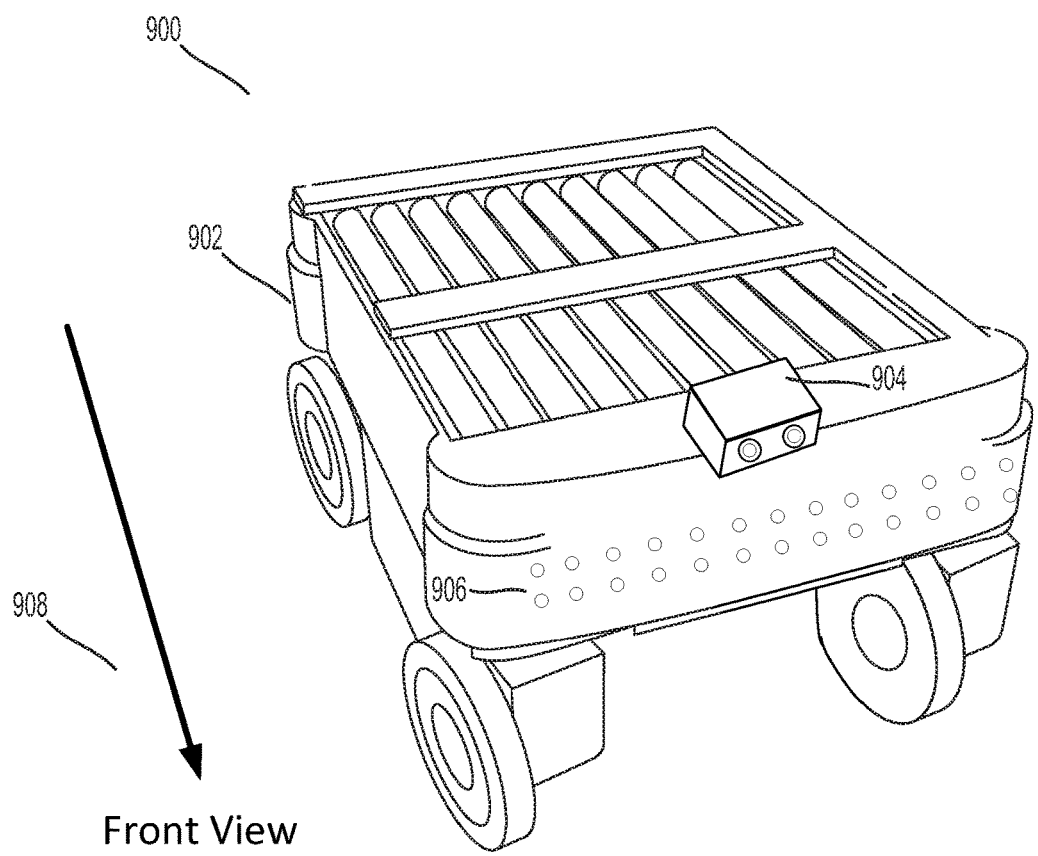
FIG. 9 illustrates a front view of a safety system in use by a robotic device, according to an example embodiment.

FIG. 3A depicts exemplary safety system 300 that may use laser sensors 306 to augment stereo sensors 304 for obstacle detection. In this example, laser sensors 306 may be arranged on the front end of robotic device 302. Each laser sensor 306 may project a narrow laser beam 310 along direction of travel 308. Laser sensors 306 may be configured to measure distances to obstacles within a short distance from robotic device 302 by continually projecting laser beams 310 as robotic device 302 moves in an area. In this example, system 300 only has two laser sensors 306 aligned horizontally at the same height on robotic device 302. In other examples, laser sensors 306 may be projecting laser beams parallel to direction of travel 308. Other examples of safety systems may contain a different number of laser sensors, with many different possible arrangements and orientations. For instance, in FIG. 3B, laser sensors 322, are arranged horizontally at the same height along the width of the front surface of robotic device 324. Another example of possible laser sensor orientation is illustrated in FIG. 9.

In example embodiments, different factors may be taken into consideration when arranging laser sensors on a robotic device. These factors may be properties of the laser and/or stereo sensors. They also may be properties of the environment that the laser sensors are in. For example, the divergence of laser beams may be taken into consideration when choosing the spacing of laser sensors on the robotic device. Laser sensor beams may diverge and spread out as each beam moves away from its respective source. As a result, the distance between adjacent laser beams may increase as the distance from the laser sources increases. This may lead to detection problems, as the beams may not be able to detect an obstacle of a predetermined minimum size (i.e. as set by the safety standards). In order to properly detect obstacles of a predetermined minimum size, the divergence of the laser beams may be accounted for. Thus, when determining the spacing of laser sensors on the robotic device, the divergence of the laser beams may be taken into consideration. However, as the divergence is a function of distance, a specific distance may be used when accounting for the divergence of the laser beams. For example, in a safety system that uses laser and stereo sensors, the laser sensors may be spaced to detect objects of at least a predetermined minimum size up to a certain distance. In this example, that distance is a distance slightly beyond the minimum range of the stereo sensor, as that is the border of the FOV of the stereo sensor. Thus, in example embodiments, at a distance slightly beyond the minimum range of the stereo sensor, the distance between adjacent diverging laser beams may not be larger than the predetermined minimum obstacle size.

Figure 4:
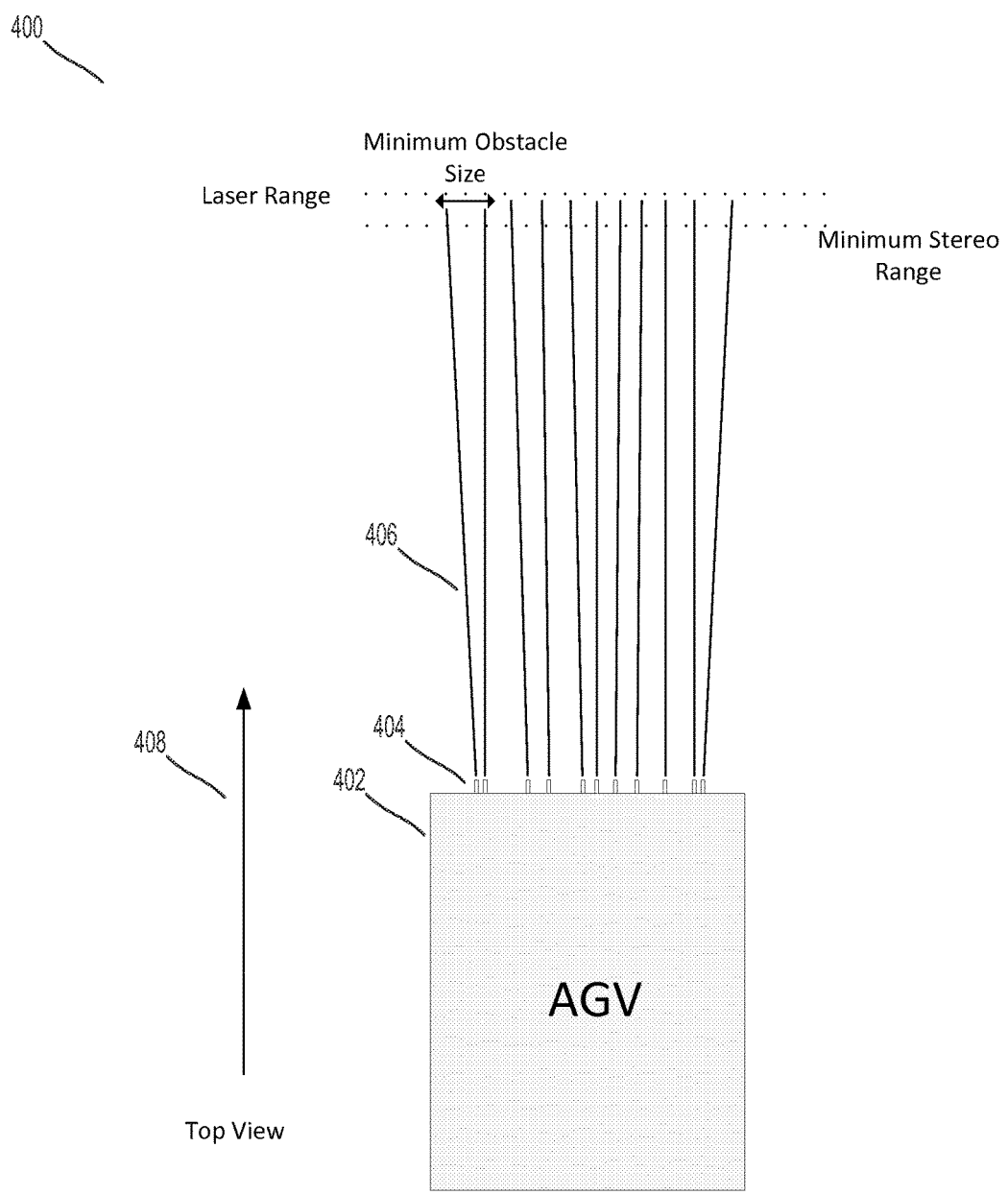
FIG. 4 illustrates an arrangement of laser sensors on a device, according to an example embodiment.

FIG. 4 illustrates a top view of the laser sensor beams of a safety system, according to an example embodiment. In this example, laser sensors 404 are arranged horizontally at a specific height on the front of robotic device 402. Each laser sensor 404 may project a single narrow beam 406 parallel to direction of travel 408. Furthermore, laser sensors 404 may be spaced across robotic device 402 in an arrangement where consecutive laser sensors are closer together than a predetermined minimum size. In other examples, laser sensors 404 may be spaced on the device such that laser beams 406 are able to detect obstacles of a predetermined minimum size at a distance slightly beyond the minimum stereo range. Specifically, as seen in FIG. 4, laser beams 406 diverge and spread out as they move away from sensors 404. This divergence is accounted for, as the distances between adjacent beams at the end of the laser range, is less than the predetermined minimum obstacle size. Further, FIG. 4 is an example representation of a possible arrangement of laser sensors, and should not be taken to be limiting. The divergence of the lasers is slightly exaggerated for representation purposes. Also, in subsequent representations of the laser coverage area, the area is shown as a continuous block in order to show the border regions of the coverage area, and not the individual beams as shown in FIG. 4.

Further, as shown in FIG. 4, the arrangement of the laser sensors on the robotic device may determine the coverage area of the laser sensors. Specifically, the laser sensors may be configured to detect obstacles of a minimum size up to a distance past the minimum stereo sensor range. The configuration of the stereo sensor(s) may also determine the stereo sensor coverage area. As such, a coverage area for each type of sensor in a safety system may be defined. Furthermore, the overall coverage area of the safety system is the combination of the coverage area for each sensor type.

Figure 5A:
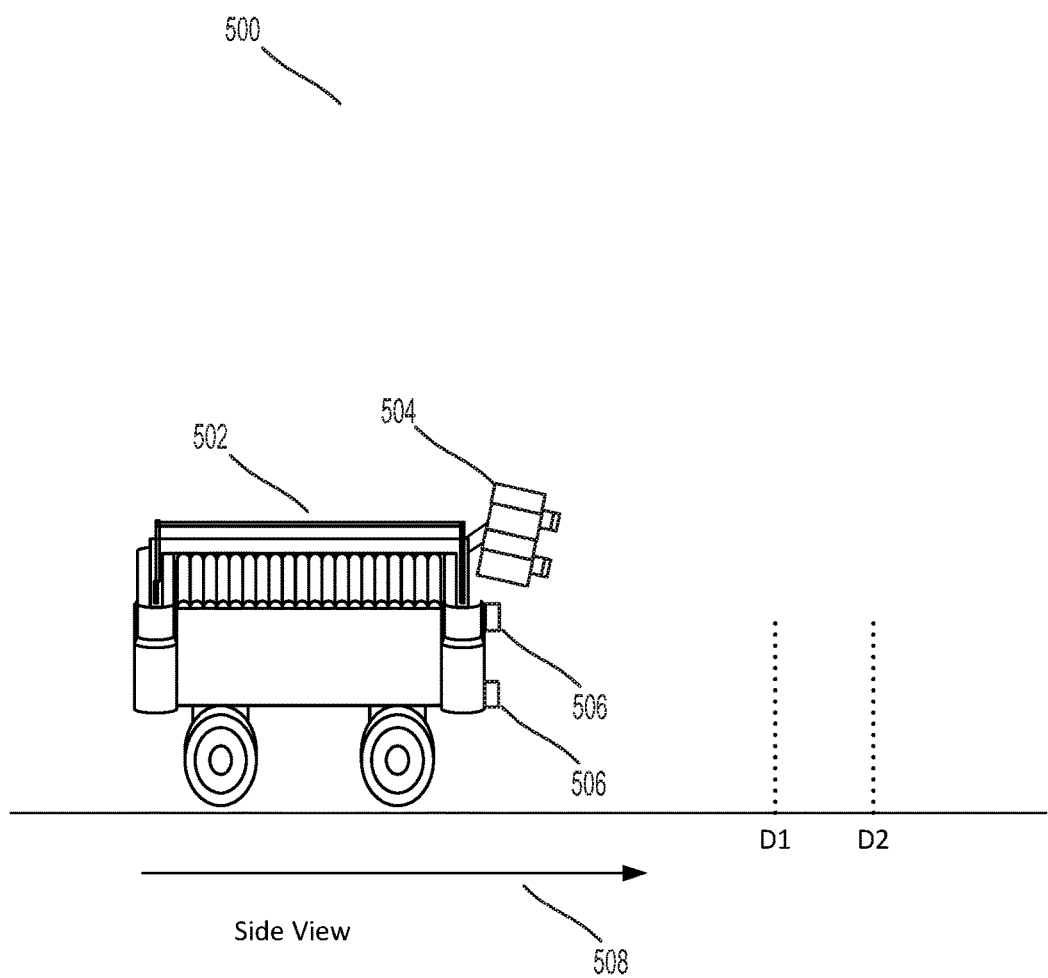
FIG. 5A illustrates a side of view of the coverage area of a safety system, according to an example embodiment.
Figure 5B:
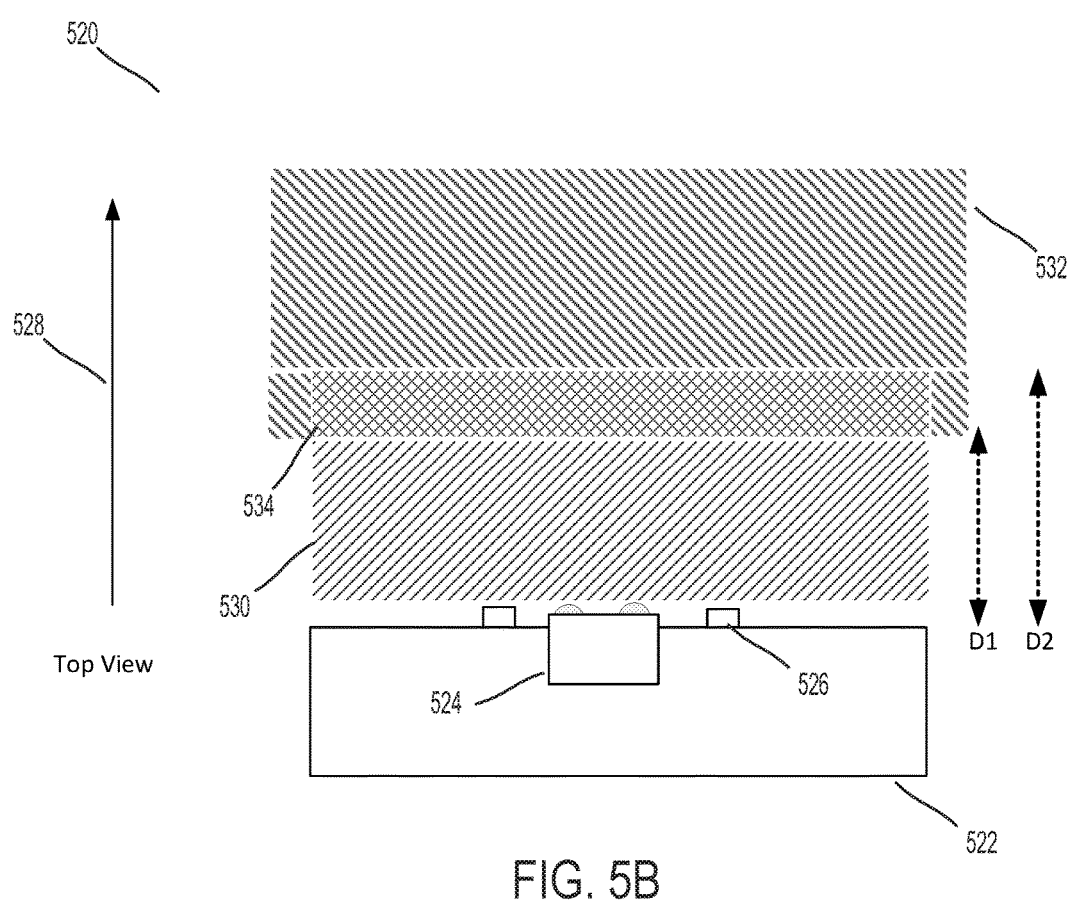
FIG. 5B illustrates a top of view of the coverage area of a safety system, according to an example embodiment.

FIGS. 5A and 5B illustrate possible coverage areas for the stereo and laser sensors of safety system 500, according to example embodiments. In FIG. 5A, safety system 500 is installed on robotic device 502 that may be moving in direction of travel 508. Safety system 500 may have a coverage area that is comprised of the coverage areas of each of laser sensors 506 and stereo sensor 504. The dimensions of the coverage area of each sensor type may depend on the configurations of the sensors. For example, the configuration of stereo sensor 504 may determine the first predetermined distance, D1. The coverage area of stereo sensor 504 may begin at a distance D1. Further, the first predetermined distance D1, may also be the distance at which the width of the coverage area of stereo sensor 504 is at least as wide as robotic device 502. The coverage area of laser sensors 506 may also have a width that is substantially as wide as robotic device 502. Further, the coverage area of laser sensors 506 extends immediately from in front of robotic device 502 up to a second predetermined distance, D2. In example embodiments, the first predetermined distance is closer to robotic device 502 than the second predetermined distance.

FIG. 5B illustrates the coverage area of safety system 520, according to an exemplary embodiment. Safety system 520 is installed on robotic device 522, which may be moving in direction of travel 528. Further, safety system 520 is comprised of stereo sensor 524 and laser sensors 526. As in FIG. 5A, coverage area 530 of laser sensors 526 extends from in front of robotic device 522 to predetermined distance, D2. Further, coverage area 530 may be substantially as wide as robotic device 522. Similarly, coverage area 532 of stereo sensor 524, is at least as wide as robotic device 522. However, coverage area 532 covers the region past predetermined distance. As shown in FIG. 5B, predetermined distance D1 is closer robotic device than predetermined distance D2. Thus, coverage area 530 and coverage area 532 overlap between distances D1 and D2. Specifically, both sensor types overlap in area 534, as shown in FIG. 5B.

Further, each sensor type in a safety system may produce data indicative of its coverage area. In example embodiments, each sensor type, i.e. laser and stereo, produces data indicative of its respective coverage area. The data that is produced by each sensor may be indicative of the presence of an object in a coverage area. The data may further indicate the distance from the robotic device to the detected object. The data may yet further indicate whether the object is stationary or moving.

Figure 6:
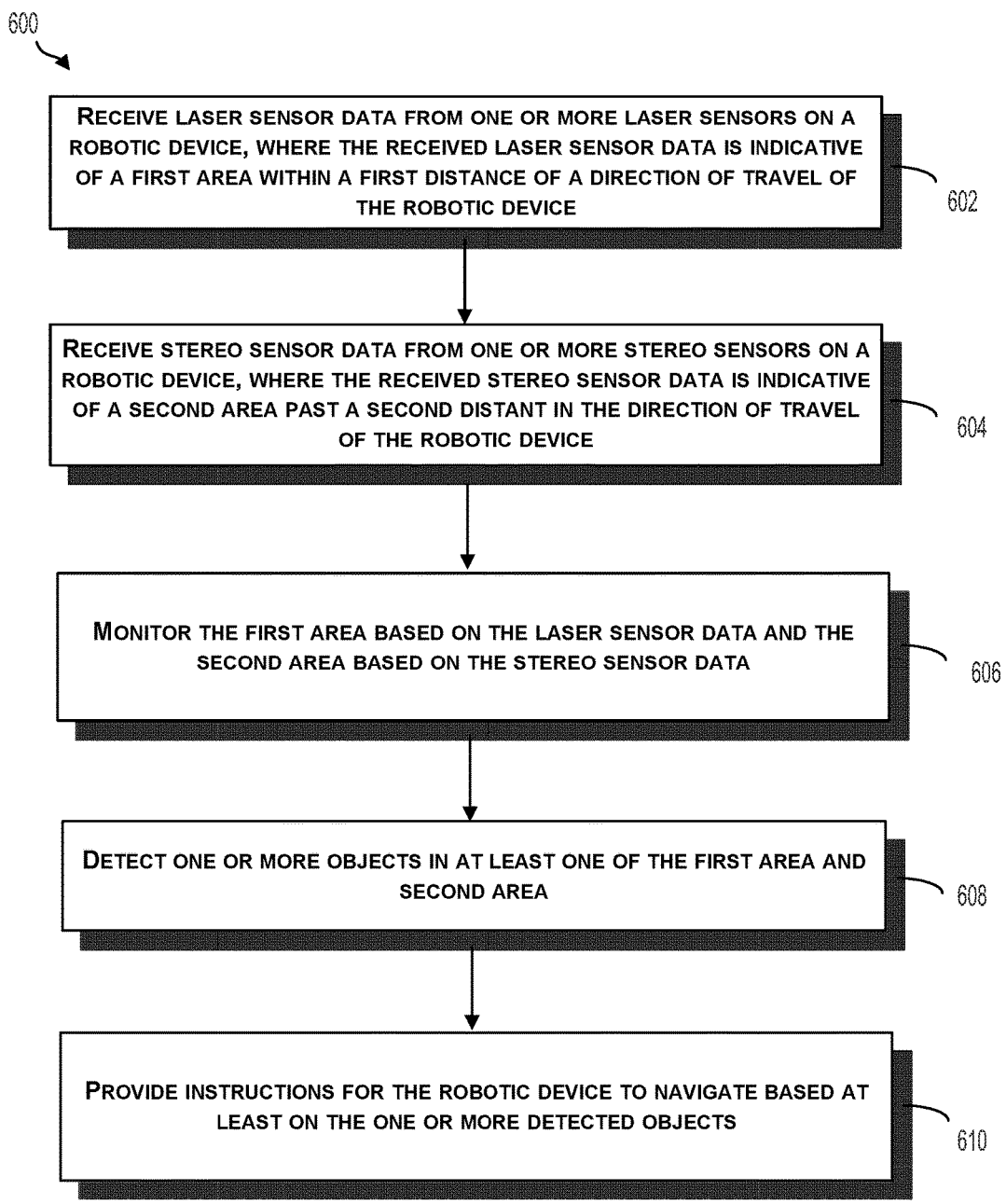
FIG. 6 is a block diagram of a method of obstacle detection, according to an example embodiment.

FIG. 6 illustrates a flowchart showing a method 600 that may detect obstacles by a safety system, according to an example embodiment. Method 600 may be carried out by a safety system independent from the local control system of a robotic device. In other examples, method 600 may be carried out by a safety system integrated with the local control system of a robotic device. The robotic device may be any of the mobile robotic devices illustrated and described previously with respect to FIGS. 1A-1B, 2A-2D, and/or 3A-3C.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 6. Where used, program code can be stored on any type of computer-readable medium, for example, such as a storage device including a disk or hard drive.

In addition, each block of the flowchart shown in FIG. 6 may represent circuitry that is wired to perform the specific logical functions in the process. Unless specifically indicated, functions in the flowchart shown in FIG. 6 may be executed out of order from that shown or discussed, including substantially concurrent execution of separately described functions, or even in reverse order in some examples, depending on the functionality involved, so long as the overall functionality of the described method is maintained.

As shown by block 602, of FIG. 6, method 600 may involve receiving data from one or more laser sensors on a robotic device, according to an example embodiment. As explained above, the laser sensor data may be acquired by the one or more laser sensors projecting narrow beams in a defined coverage area in the direction of travel of the robotic device. The narrow beams may reflect off of any obstacle of at least a predetermined size that may be found in the defined coverage area. The laser sensors are arranged on the robotic device with a defined spacing in order to ensure that obstacles of at least a predetermined size may be detected by the laser sensors in the defined coverage area. In some examples, the laser sensors may be spaced across the robotic device such that consecutive laser sensors are closer together than a predetermined minimum obstacle size. Furthermore, the coverage area may substantially be the width of the robotic device in width, and up to a predetermined distance in length. The predetermined distance up to which the coverage area of the laser sensor may extend, may be the first predetermined distance of the exemplary safety system.

Method 600 further involves receiving stereo sensor data from one or more stereo sensors on a robotic device, according to an example embodiment. The one or more stereo sensors may be mounted on the front end of the device facing the direction of travel of the robotic device. The stereo sensor data may be acquired by using the two optical elements of the stereo sensor to take images of the scene from at least two viewpoints in the direction of the travel direction of the robotic device. Images from each optical element are then correlated to find possible corresponding features. After matches are determined, the distances to the detected objects may be calculated. Furthermore, as described in block 604, the stereo sensor data is indicative of a coverage area past a predetermined distance in the direction of the travel of the robotic device. The coverage area may have a width at least as wide as the robotic device, and may extend from at least a predetermined distance. The predetermined distance from which the coverage area of the stereo sensor(s) starts, may be a second predetermined distance of the safety system of the robotic device.

Accordingly, the coverage area of the safety system of the robotic device may be comprised of at least two coverage areas. In some embodiments, the coverage areas of the safety system may overlap. In an example safety system, the coverage area of the safety system may be comprised of two coverage areas. The first coverage area may be the area that is covered by laser sensors. The first coverage area may have a width that is substantially as wide as the robotic device, and a length up to a first predetermined distance. The second coverage area may have a width at least as wide as the robotic device, and a length that may start past a second predetermined distance. In some embodiments, the second predetermined distance may be closer to the robotic device than the first predetermined distance. Accordingly, there is an overlap between the first coverage area and the second coverage area. Furthermore in some embodiments, the width of the second device may be a varying width, that is at least as wide as the robotic device.

Method 600 further entails monitoring the first area based on the laser sensor data and the second area based on the stereo sensor data, as described in block 606. As explained, a safety system coverage area may be comprised of two coverage areas, where each area is the coverage area of a type of sensor. As such, the first area is the coverage area of the laser sensor, and thus the controller monitors the first area according to the laser sensor data. Similarly, the second area is the coverage area of the stereo sensor, and thus the controller monitors the second area according to the laser sensor data.

Further, as described in block 608, the controller is able to detect any object that may be located in either area, by using the sensor data indicative of each coverage area. The sensor data indicative of each coverage area may include data detailing the presence of an object. The data may also include the distance from the robotic device to the detected object.

Finally, method 600 entails providing the data of the sensors and instructions to the control system of the robotic device to navigate based at least on the one or more detected objects, as described by block 610. The control system of the robotic device may use the data and instructions provided by the sensors to assist in navigation. The control system may also account for uncertainty in the sensor data. For example, the control system of the robotic device may account for uncertainty in data based on the distance of the detected object from the robotic device. As the distance from the sensors increases, the margin of error in data increases, which the control system accounts for. For example, the data that the control system receives indicates that two identical obstacles are located at distance 1 and distance 2, where distance 2 is farther from robotic device from distance 1. Although the obstacles are identical, the control system of the robotic device may instruct the robotic device to react differently to each obstacle due to the larger margin of error of the data indicative of the obstacle at distance 2. For instance, the control system may provide different speed and maneuvering instructions to the robotic device when avoiding each obstacle. In another example, the control system of the robotic device may calculate different safe minimum stopping distances with respect to each obstacle.

FIG. 7 illustrates safety system 700, according to an exemplary embodiment. Safety system 700 is installed on robotic device 702 that is traveling in direction 718. In this embodiment, safety system 700 includes optical elements 704, 706, 708 and laser sensors 710. Laser sensors 710 may project narrow laser beams in direction 718. Laser sensors 710's coverage area 712 extends from immediately in front of robotic device 702 up to distance. Further, coverage area 712 may have a width that is substantially as wide as the robotic device. Optical elements 704, 706, and 708 may make up two stereo sensors of the safety system. Specifically, optical elements 704 and 708 are primary optical elements, whereas optical element 706 is a secondary optical element. The first stereo sensor is made up of primary optical element 708 providing the sensor with a first viewpoint and secondary optical element 706 providing the sensor with a second viewpoint. As such the first stereo sensor may operate by correlating possible features in images from optical element 708 and secondary optical element 706. As for the second stereo sensor, it is made up of primary optical element 704 providing the sensor with a first viewpoint and secondary optical element 706 providing the sensor with a second viewpoint. As such, the second stereo sensor operates by correlating possible features in images from primary optical element 704 and secondary optical element 706. As can be seen in FIG. 7, the distance between the cameras of the first stereo sensor is less than the distance between the cameras of the second stereo sensor. The configuration of the first stereo sensor may be referred to as a narrow baseline arrangement, and the configuration of the second stereo sensor may be referred to as a wide baseline arrangement.

Furthermore, the two stereo sensors have an overall coverage area 720. This overall coverage area is made up of coverage area 722 and coverage are 716. Coverage area 722 is the coverage area of the first stereo sensor, and coverage area 716 is the coverage area of the second stereo sensor. As seen in FIG. 7, coverage area 722 extends past a distance D1 up to a distance D3, where D1 is closer to robotic device 702 than D2 and D3. Thus, in this configuration, coverage area 722 overlaps with coverage area 712. This overlapping region is shown in FIG. 7 as coverage region 714. Furthermore, in other exemplary embodiments, coverage area 722 and coverage area 712 may not overlap. In yet other exemplary embodiments, coverage area 716 may overlap with coverage area 722.

Specific examples will now be discussed with regards to safety systems of a robotic device, such as for the various systems discussed above. Note that these examples are provided for exemplary purposes only and are not meant to be limiting.

Figure 8:
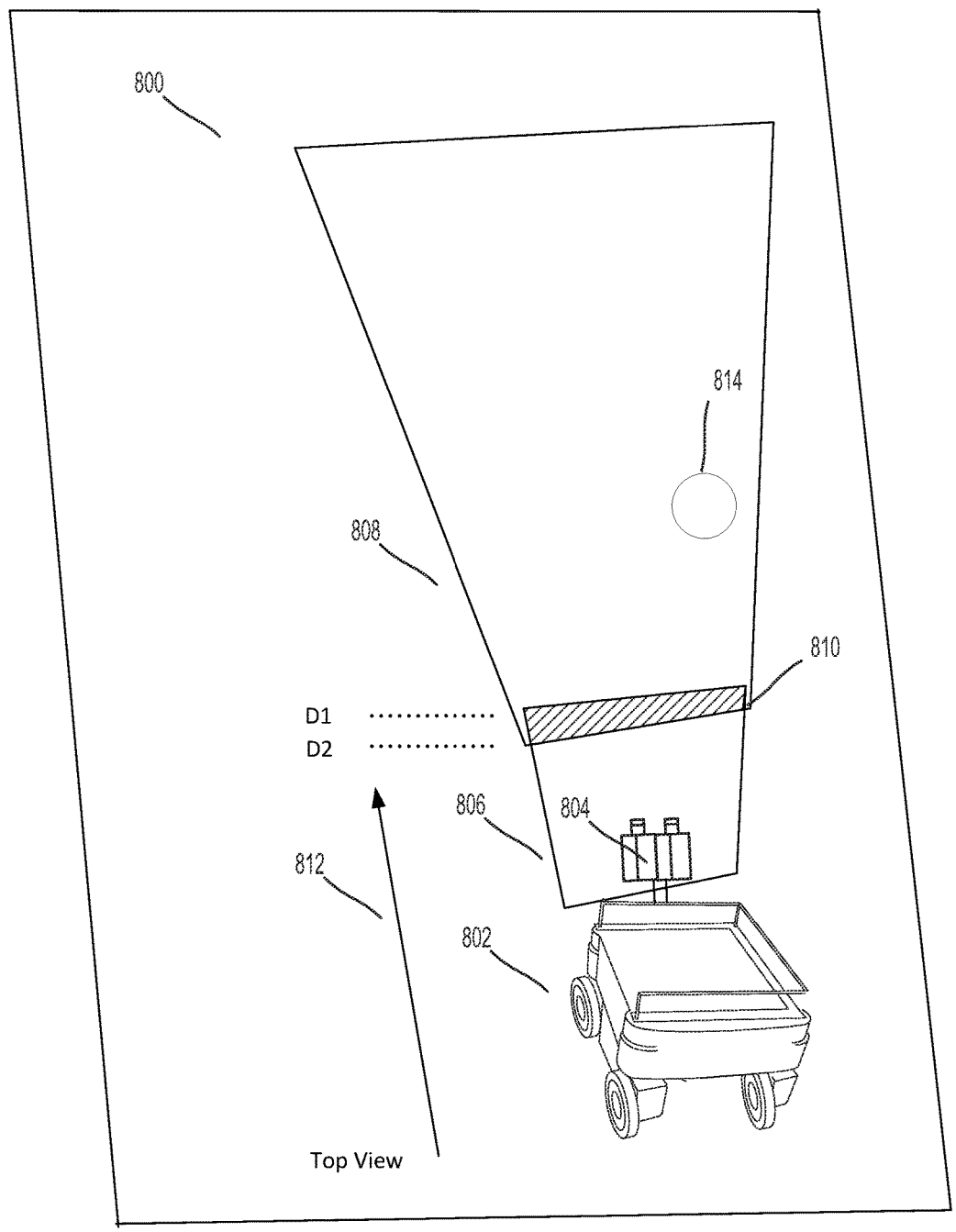
FIG. 8 illustrates a top view of a safety system in use by a robotic device, according to an example embodiment.

FIG. 8 illustrates a safety system, according to example embodiments. This safety system is installed on robotic device 802, which is moving in travel direction 812. Further, safety system 800 is comprised of stereo sensor 804 and laser sensors (not shown). As shown in FIG. 8, coverage area 800 of the safety sensor is comprised of two coverage areas. The first coverage area, coverage area 806, is the coverage area of the laser sensors of the safety system. The width of coverage area 806 is wider than robotic device 802 in width, and extends up to D1 in length. The second coverage area, coverage area 808, is the coverage area of stereo sensor 804. However, although, the second coverage area of the safety system is at least as wide as robotic device 802, it has a varying width that increases at distances farther away from robotic device 802. Further, coverage area 808 starts past distance D2, which is closer to robotic device 802 than distance D1. Thus, there is an overlap between the coverage areas of stereo sensor 804 and the coverage area of the laser sensor. This overlap region is shown in FIG. 8 as shaded region 810.

The laser sensors and stereo sensor 804 produce data indicative of their respective coverage areas. This data may indicate the position of an obstacle and its distance from robotic device 802. In this example, no obstacles exist in coverage area 806 that corresponds to the laser sensors. However, obstacle 814 exists in coverage area 808 that corresponds to stereo sensor 804. The data indicating the status of the coverage areas is then sent to the controller of the safety system. In this case, the data may reflect that obstacle 814 exists in coverage area 808. Accordingly, the controller may detect obstacle 814 in coverage area 808. The controller may then forward the information regarding the obstacle, along with navigational instruction to the control system of the robotic device. In this case, the instructions may include a slight change in the direction of travel 812 in order to safely avoid obstacle 814.

FIG. 9 illustrates a front view of safety system 900, according to an exemplary embodiment. As can be seen in FIG. 9, stereo sensor 904 and laser sensors 906, comprise safety system 900. Further, laser sensors 906 and stereo sensor 904 are attached to the front end of robotic device 902, which is traveling in direction of travel 908. Specifically, stereo sensor 904 is a single device sensor with two cameras, and is attached to a mount (not shown) that is connected to the front end of robotic device 902. In this embodiment, laser sensors 906 are arranged in two horizontal rows, where each row is arranged at a specific height. Furthermore, the laser sensors may be oriented such that the laser beams (not shown) are parallel to direction of travel 908. In this configuration, laser sensors 906 may be able to detect obstacles of different heights. In other examples, laser sensors 906 may also be able to estimate the height of different obstacles. In yet other embodiments, laser sensors 906 may be able to detect overhanging obstacles of varying lengths that may impede the movement of robotic device 902.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or nonvolatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
a first stereo sensor coupled to a robotic device, the first stereo sensor comprising a first primary optical element and a secondary optical element;
a plurality of lasers arranged on the robotic device such that at a minimum range of the first stereo sensor, each distance between diverging laser beams from adjacent lasers of the plurality of lasers is less than a predetermined minimum obstacle size; and
a controller configured to:
receive, from the first stereo sensor, stereo sensor data indicative of a first scanned area, wherein the first scanned area extends from the minimum range of the first stereo sensor;
receive, from the plurality of lasers, laser sensor data indicative of a second scanned area, wherein the second scanned area extends from the robotic device past the minimum range of the first stereo sensor;
based on the stereo sensor data or the laser sensor data, detect an object in the first scanned area or the second scanned area; and
based on the detected object, provide navigation instructions to the robotic device.

2. The system of claim 1, further comprising a second stereo sensor coupled to the robotic device, the second stereo sensor comprising a second primary optical element and the secondary optical element.

3. The system of claim 2, wherein the first primary optical element and the secondary optical element are positioned closer together than the second primary optical element and the secondary optical element.

4. The system of claim 2, wherein the optical elements of the first stereo sensor are spaced in a narrow baseline arrangement, and wherein the optical elements of the second stereo sensor are spaced in a wide baseline arrangement.

5. The system of claim 1, wherein the first scanned area starts at a distance from the robotic device at which a field of view of the first stereo sensor is at least as wide as the robotic device.

6. A method comprising:
receiving stereo sensor data from a first stereo sensor coupled to a robotic device,
wherein the first stereo sensor comprises a first primary optical element and a secondary optical element,
wherein the stereo sensor data is indicative of a first scanned area, and
wherein the first scanned area extends from a minimum range of the first stereo sensor;
receiving laser sensor data from a plurality of lasers coupled to the robotic device,
wherein the plurality of lasers are arranged on the robotic device such that at the minimum range of the first stereo sensor, each distance between diverging laser beams from adjacent lasers of the plurality of lasers is less than a predetermined minimum obstacle size,
wherein the laser sensor data is indicative of a second scanned area, and
wherein the second scanned area extends from the robotic device past the minimum range of the first stereo sensor;
monitoring the first scanned area and the second scanned area;
detecting an object in the first scanned area or the second scanned area; and
providing navigation instructions to the robotic device such that the robotic device avoids colliding with the object.

7. The method of claim 6, further comprising receiving stereo sensor data from a second stereo sensor coupled to the robotic device, wherein the second stereo sensor comprises a second primary optical element and the secondary optical element.

8. The method of claim 7, wherein the first primary optical element and the secondary optical element are positioned closer together than the second primary optical element and the secondary optical element.

9. The method of claim 6, wherein monitoring the first scanned area and the second scanned area comprises:
monitoring the first scanned area and the second scanned area for objects located in a path of the robotic device.

10. The method of claim 6, wherein providing navigation instructions to the robotic device comprises:
determining a distance of the object from the robotic device;
based on the distance, determining a margin of error in the stereo sensor data; and
based on the distance and the margin of error, determining the navigation instructions.

11. A robotic device comprising:
at least one motion component configured to cause motion of the robotic device;
a first stereo sensor comprising a first primary optical element and a secondary optical element;
a plurality of lasers arranged on the robotic device such that at a minimum range of the first stereo sensor, each distance between diverging laser beams from adjacent lasers of the plurality of lasers is less than a predetermined minimum obstacle size; and
a controller configured to:
receive, from the first stereo sensor, stereo sensor data indicative of a first scanned area in front of the robotic device, wherein the first scanned area extends from the minimum range of the first stereo sensor;
receive, from the plurality of lasers, laser sensor data indicative of a second scanned area, wherein the second scanned area extends from the robotic device past the minimum range of the first stereo sensor;

based on the stereo sensor data or the laser sensor data, detect an object in the first scanned area or the second scanned area; and control the at least one motion component such that the robotic device avoids colliding with the detected object.

12. The robotic device of claim 11, further comprising a second stereo sensor, wherein the second stereo sensor comprises a second primary optical element and the secondary optical element, and wherein the optical elements of the first stereo sensor are spaced in a narrow baseline arrangement, and wherein the optical elements of the second stereo sensor are spaced in a wide baseline arrangement.

* * * * *